(12) United States Patent
Sutardja

(10) Patent No.: US 7,477,467 B1
(45) Date of Patent: Jan. 13, 2009

(54) PREAMP CIRCUIT INCLUDING A LOOPBACK MODE FOR DATA STORAGE

(75) Inventor: Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 726 days.

(21) Appl. No.: 10/722,079

(22) Filed: Nov. 25, 2003

(51) Int. Cl.
*G11B 5/09* (2006.01)
(52) U.S. Cl. .......................................... 360/46; 360/31
(58) Field of Classification Search ....................... None
See application file for complete search history.

(56) References Cited

U.S. PATENT DOCUMENTS

| | | | |
|---|---|---|---|
| 6,304,403 B1 * | 10/2001 | Ionescu | 360/67 |
| 6,424,475 B1 * | 7/2002 | Bhandari et al. | 360/31 |
| 6,765,736 B2 * | 7/2004 | Ko et al. | 360/46 |
| 2002/0176189 A1 * | 11/2002 | Cyrusian | 360/46 |

* cited by examiner

*Primary Examiner*—Jason C Olson

(57) ABSTRACT

A data storage device preamp circuit includes a write amplifier having an input and an output. A read amplifier has an input and an output. A loopback circuit selectively connects the output of the write amplifier to the output of the read amplifier. A read channel circuit for a data storage device includes a first counter that generates a first count of an attribute of a write signal that is output by the read channel circuit. A second counter generates a second count of the attribute of a read signal that is received by the read channel circuit. A comparator compares the first count and the second count.

62 Claims, 8 Drawing Sheets

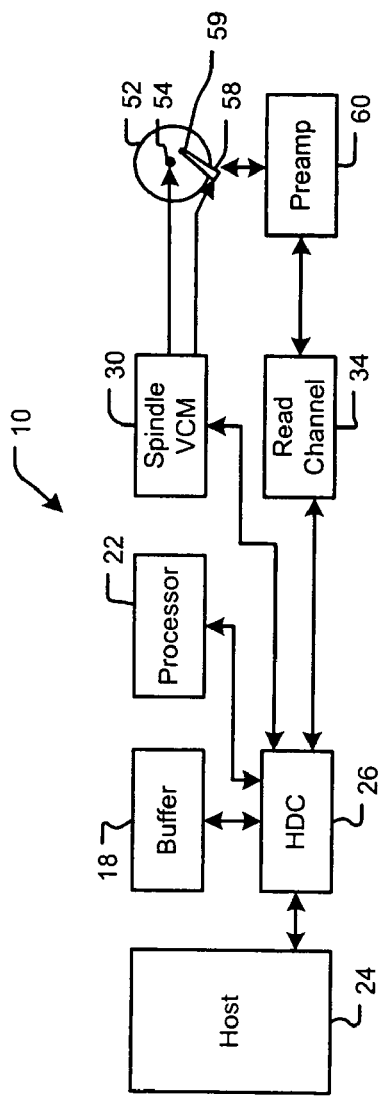
FIG. 1
_Prior Art_
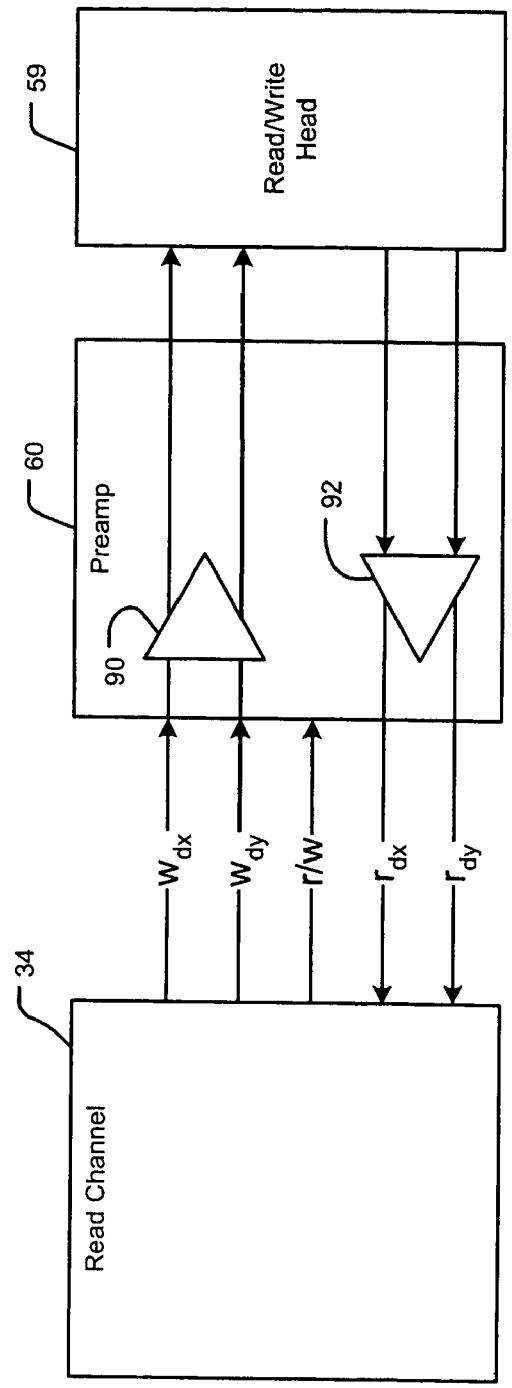
FIG. 2
_Prior Art_

PREAMP CIRCUIT INCLUDING A LOOPBACK MODE FOR DATA STORAGE

FIELD OF THE INVENTION

The present invention relates to data storage devices, and more particularly to preamplifiers and read channel circuits in data storage devices.

BACKGROUND OF THE INVENTION

Referring now to FIG. 1, an exemplary data storage device 10 is shown. A buffer 18 stores data that is associated the control of a hard disk drive. The buffer 18 may employ SDRAM or other types of low latency memory. A processor 22 performs processing that is related to the operation of the hard disk drive. A hard disk controller (HDC) 26 communicates with the buffer 18, the processor 22, a host 24, a spindle/voice coil motor (VCM) driver 30, and/or a read/write channel circuit 34.

During a write operation, the read/write channel circuit or read channel circuit 34 encodes the data to be written onto the storage medium. The read/write channel circuit 34 processes the signal for reliability and may include, for example error correction coding (ECC), run length limited coding (RLL), and the like. During read operations, the read/write channel circuit 34 converts an analog output from the medium to a digital signal. The converted signal is then detected and decoded by known techniques to recover the data written on the hard disk drive.

One or more hard drive platters 52 include a magnetic coating that stores magnetic fields. The platters 52 are rotated by a spindle motor that is schematically shown at 54. Generally the spindle motor 54 rotates the hard drive platter 52 at a fixed speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

A read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic fields on the platter 52. A preamplifier (preamp) circuit 60 amplifies analog read/write signals. When reading data, the preamp circuit 60 amplifies low level signals from the read element and outputs the amplified signal to the read/write channel circuit 34. While writing data, a write current that flows through the write element of the read/write device 59 is switched to produce a magnetic field having a positive or negative polarity. The positive or negative polarity is stored by the hard drive platter 52 and is used to represent data.

Referring now to FIG. 2, the read channel circuit 34 outputs write signals $w_{dx}$ and $w_{dy}$ to the preamp circuit 60 when writing data. The preamp circuit 60 amplifies the write signals using a write amplifier 90. The amplified write signals are output to the read/write device 59. When reading data, the preamp circuit 60 receives signals from the read/write device 59, amplifies the signals using a read amplifier 92 and outputs amplified read signals $r_{dx}$ and $r_{dy}$ to the read channel circuit 34. In current data storage device architectures, there is no way to test whether the preamp circuit 60 is operating properly. Therefore, it is difficult to diagnose malfunctions in the preamp circuit 60.

SUMMARY OF THE INVENTION

A data storage device preamp circuit according to the present invention includes a write amplifier having an input and an output. A read amplifier has an input and an output. A loopback circuit selectively connects the output of the write amplifier to the output of the read amplifier.

In other features, the write amplifier amplifies a write signal from a read channel circuit and outputs the amplified write signal to a read/write device. The read amplifier amplifies a read signal that is received from the read/write device and outputs the amplified read signal to the read channel circuit.

In still other features, the loopback circuit includes at least one of a switch and a multiplexer that selectively connects the output of the write amplifier to the output of the read amplifier.

In still other features, a trigger controls the switch and/or the multiplexer. Alternatively, the switch and/or the multiplexer is controlled by a write enable signal from the read channel circuit.

A read channel circuit for a data storage device according to the present invention includes a first counter that generates a first count of an attribute of a write signal that is output by the read channel circuit. A second counter generates a second count of the attribute of a looped-back write signal that is received by the read channel circuit.

In other features, a comparator compares a difference between the first count and the second count to a threshold and outputs a first state when the difference is less than the threshold and a second state when the difference is not less than the threshold. The read channel circuit generates a write enable signal that is output to a preamp circuit to enable a loopback mode of the preamp circuit. The attribute can be a rising edge, a falling edge and a pulse.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of an exemplary data storage device according to the prior art;

FIG. 2 is a functional block diagram of a read channel circuit and preamp circuit according to the prior art;

DETAILED DESCRIPTION OF THE PREFERRED EMBODIMENTS

Figure 3A:
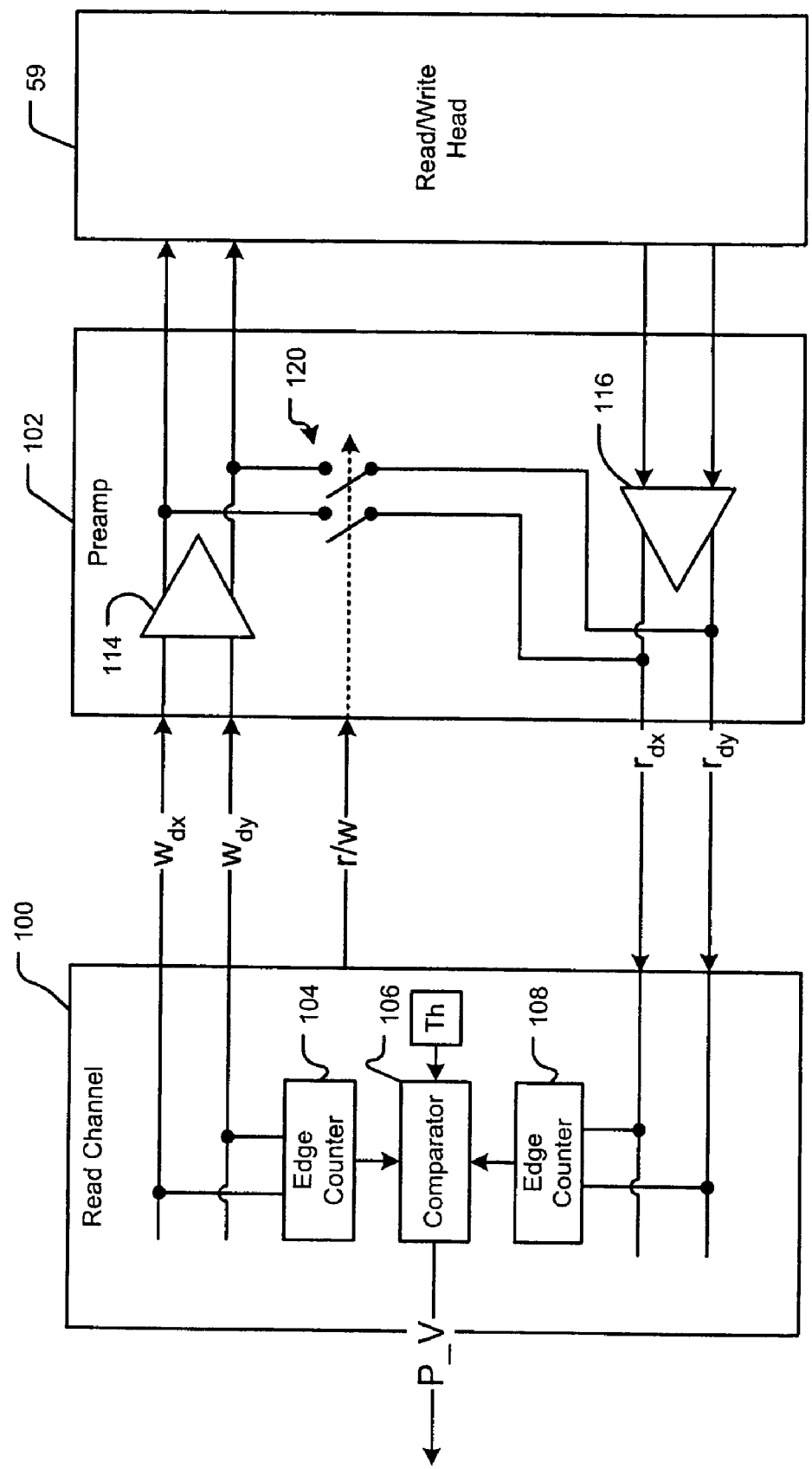
FIG. 3A is a functional block diagram of a first exemplary read channel circuit and a preamp circuit with switched loopback according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 3A, a functional block diagram of a read channel circuit 100 and a preamp circuit 102 according to the present invention is shown. The read channel circuit 100 includes a first counter 104 that counts an attribute of the write signal $w_{dx}$ and $w_{dy}$. An output of the first counter 104 is input to a comparator 106, which has a threshold Th. A second counter 108 counts the selected attribute of the read signal $r_{dx}$ and $r_{dy}$ that is received from the preamp circuit 102. For example, the counters 104 and 108 can count a rising edge, a falling edge, a pulse and/or any other attribute of the write signal and the looped-back write signal. The counted attributes allow a comparison to be made between the write signal and the looped-back write signal, which indicates the operability of the preamp circuit 102.

The preamp circuit 102 includes a write amplifier 114 that is located in the write path. The write amplifier 114 amplifies the write signal $w_{dx}$ and $w_{dy}$ and outputs the amplified write signal to the read/write device 59. The preamp circuit 102 also includes a read amplifier 116 that receives read signals from the read/write device 59, amplifies the read signals to generate the read signals $r_{dx}$ and $r_{dy}$, and outputs the amplified read signals to the read channel circuit 100.

The preamp circuit 102 provides a loopback mode during which the write amplifier 114 of the preamp circuit 102 is tested. In FIG. 3A, a switch 120 connects an output of the write amplifier 114 to an output of the read amplifier 116. When the switch 120 is used, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 3B:
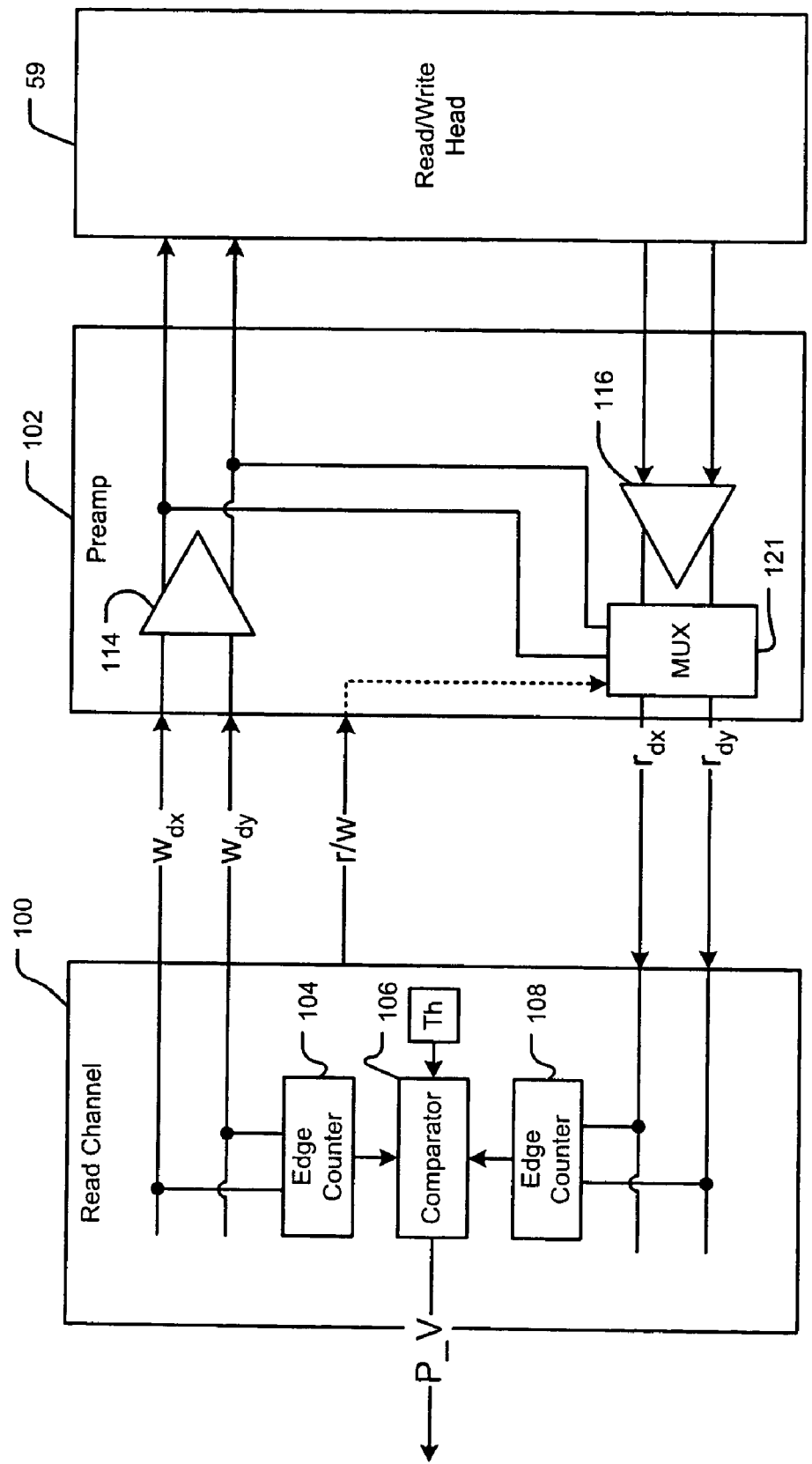
FIG. 3B is a functional block diagram of a first exemplary read channel circuit and a preamp circuit with multiplexed loopback according to the present invention.

As can be appreciated, other devices such as a multiplexer can be used by the loopback circuit. Referring now to FIG. 3B, a multiplexer 121 is used to connect the output of the write amplifier 114 to the read channel 100. The multiplexer 121 also disconnects the output of the read amplifier 116 at the same time, which reduces noise.

Referring now to FIGS. 3A and 3B, a write enable signal (r/w) is generated by the read channel circuit 100 during a write operation. In one embodiment, the write enable signal controls the switch 120 or the multiplexer 121. The output of the write amplifier 114 is looped back by the switch 120 or the multiplexer 121 to the read channel circuit 100. In other words, the switch 120 or the multiplexer 121 connects the output of the write amplifier 114 to the read signal input of the read channel 100. When the write enable signal is not asserted (e.g. during a read operation), the output of the write amplifier 114 is not looped back by the switch 120 or the multiplexer 121 to the read channel circuit 100.

The first counter 104 generates a first count of the selected attribute of the write signal. The first count is output to the comparator 106. The second counter 108 receives the amplified write signal that is looped back through the write amplifier 114. The second counter 108 generates a second count of the attribute for the looped-back write signal. The second count is output to the comparator 106. The comparator 106 compares a difference between the first and second counts to a threshold (Th).

If the difference between the first and second counts are less than or equal to the threshold, the comparator 106 outputs a first state. If the difference between the first and second counts are not less than or equal to the threshold, the comparator 106 outputs a second state. The first state corresponds to an operational preamplifier circuit. The second state corresponds to a non-operational preamplifier circuit. Faults and/or flags can optionally be generated when the comparator outputs the second state. As can be appreciated, testing of the preamp circuit 102 can be performed when the write enable signal is present. In addition, the testing can be performed at other intervals. For example, testing can be performed when the write enable signal is present during startup, periodically, randomly, during all write operations, in response to a particular event or events, or in any other suitable manner.

Figure 4:
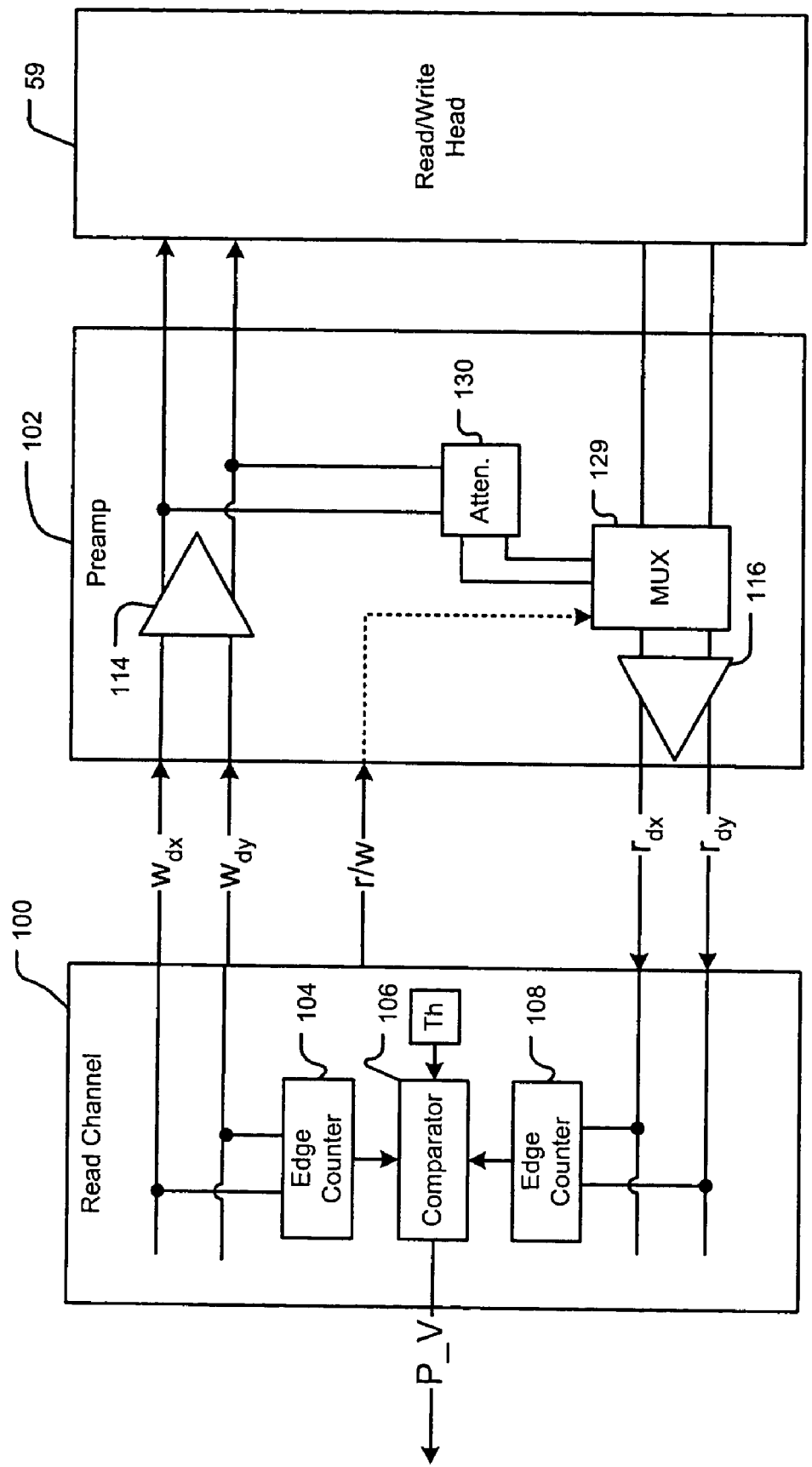
FIG. 4 is a functional block diagram of a second exemplary read channel circuit and preamp circuit with loopback according to the present invention.

Referring now to FIG. 4, a functional block diagram of a second exemplary read channel circuit 100 and preamp circuit 102 according to the present invention are shown. In FIG. 4, both the write amplifier 114 and the read amplifier 116 are tested at the same time. When the write enable signal is present, the output of the write amplifier 114 is connected by a multiplexer 129 through an optional attenuator circuit 130 to an input of the read amplifier 116. The attenuator circuit 130 attenuates the output of the write amplifier 114 if needed to prevent damage to the read amplifier 116. The multiplexer 129 disconnects the input of the read amplifier 116 from the read/write head 59.

Figure 5:
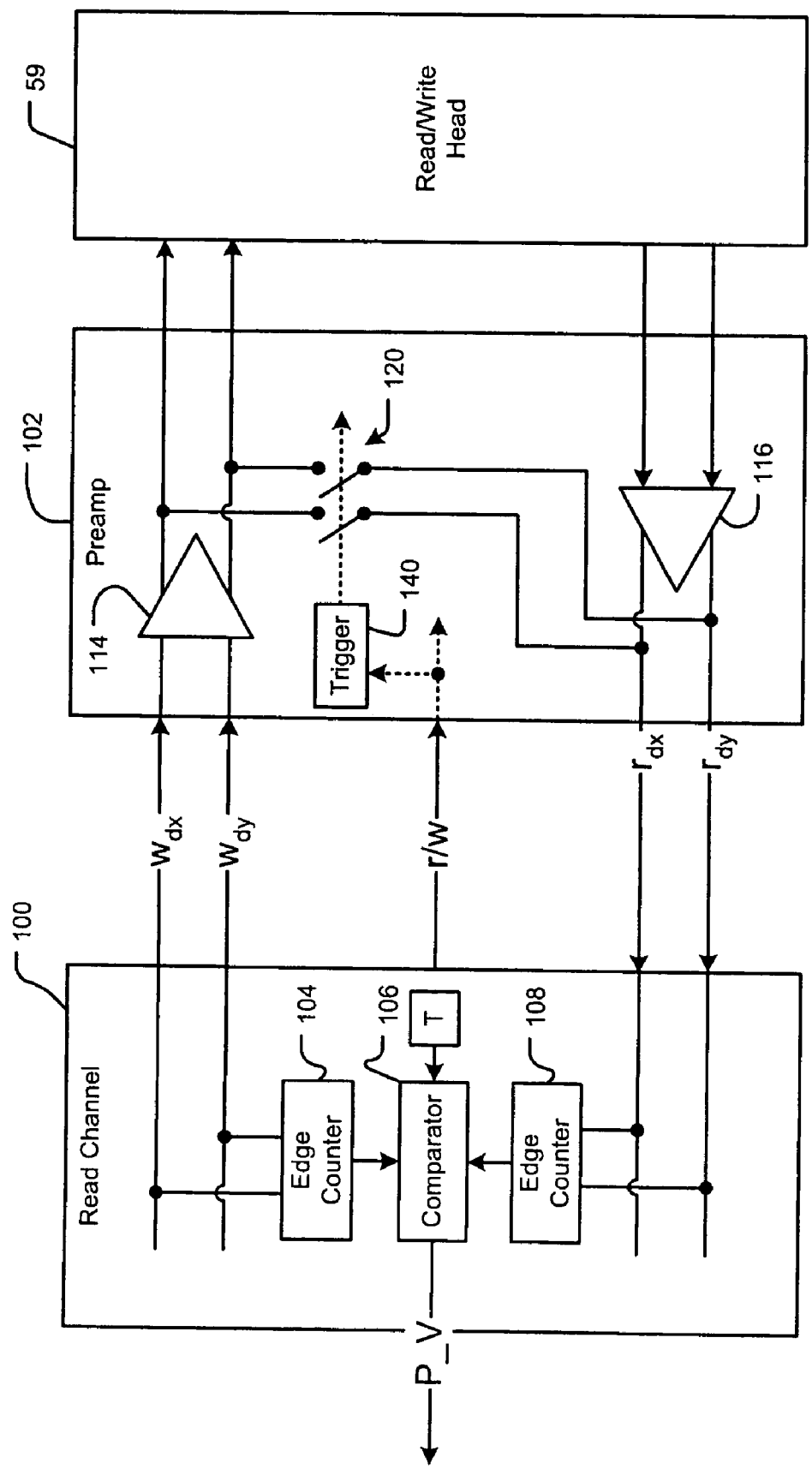
FIG. 5 is a functional block diagram of a third exemplary read channel circuit and preamp circuit with loopback according to the present invention.
Figure 6:
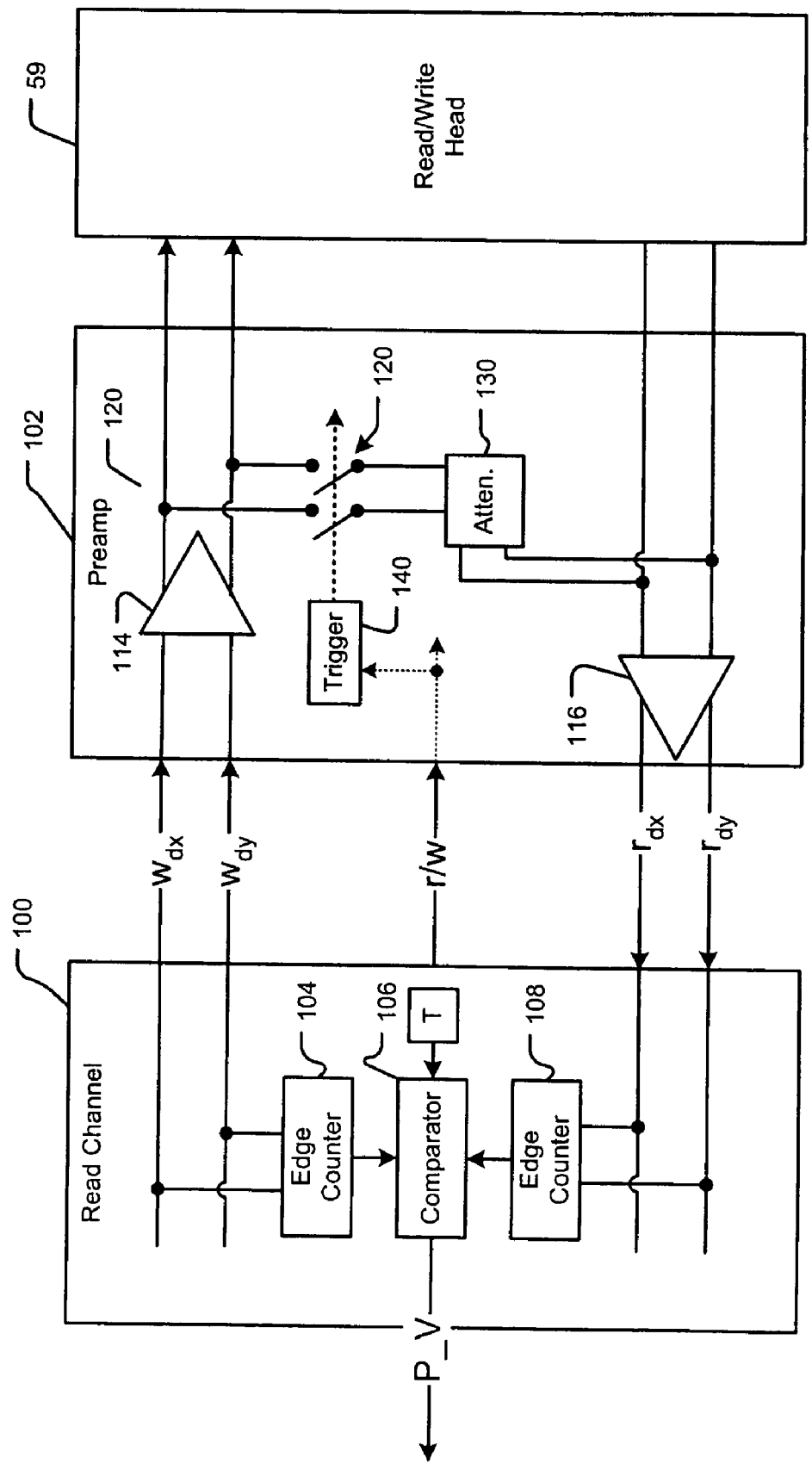
FIG. 6 is a functional block diagram of a fourth exemplary read channel circuit and preamp circuit with loopback according to the present invention.

Referring now to FIGS. 5 and 6, functional block diagrams of third and fourth exemplary read channel circuits 100 and preamp circuits 102 are shown. The read channel circuits 100 and preamp circuits 102 in FIGS. 5 and 6 are similar to those shown in FIGS. 3 and 4, respectively. However, instead of using the write enable signal to initiate the test, the preamp circuit 102 includes a trigger 140 that automatically triggers the loopback mode periodically when the write enable signal is present. For example, the trigger 140 can be triggered during startup when the write enable signal is present. The test enable signal that is generated by the trigger 140 remains high for a predetermined period during which the testing of the write amplifier 114 is performed. After the test is complete, the test enable signal goes low until the next startup. When the switch 120 is used in FIG. 5, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 7:
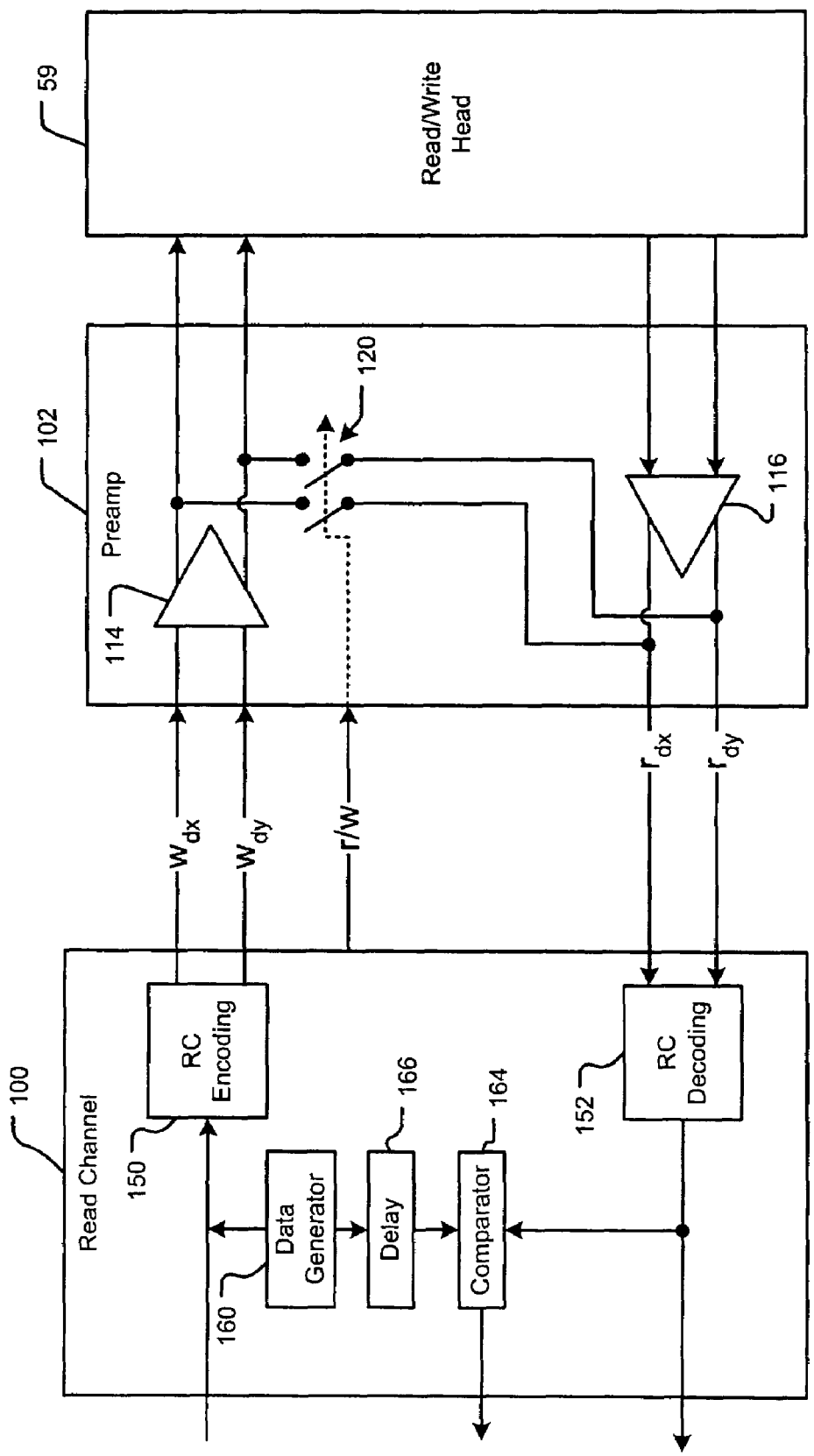
FIG. 7 is a functional block diagram of a read channel circuit that includes a data generator, a delay element and a comparator and preamp circuit with loopback according to the present invention.

Referring now to FIG. 7, the read channel (RC) circuit 100 includes a RC encoding circuit 150 in the write path and a RC decoding circuit 152 in the read path. The read channel circuit 100 includes a data generator 160 that generates a test symbol that is encoded and transmitted as a write signal to the preamp circuit 102. The write signal is amplified by the write amplifier 114 and looped back by the switch 120 during the loopback mode to the RC decoding circuit 152. The RC decoding circuit 152 decodes the write signal and outputs a received symbol to a comparator 164. As can be appreciated, a multiplexer may also be used.

The comparator 164 compares the received symbol to a delayed test signal. A delay element 166 can be used to delay the test symbol for an appropriate amount of time. As can be appreciated, a latch, a buffer or any other suitable device can alternatively be used to store the test symbol until the received symbol is received at the comparator 164. If the received symbol and test symbol match, the comparator 164 outputs a first state. If the symbols do not match, the comparator 164 outputs a second state. The first state corresponds to an operational preamplifier circuit. The second state corresponds to a non-operational preamplifier circuit. Faults and/or flags can optionally be generated when the comparator outputs the second state. When the switch 120 is used in FIG. 7, the read amplifier 116 is optionally turned off during the loopback mode to reduce noise in the system due to signals from the read/write head 59. Turning off the read amplifier 116 may be accomplished by turning off or disconnecting a supply voltage, disconnecting the input of the read amplifier 116 from the read/write head and/or grounding the inputs of the read amplifier 116.

Figure 8:
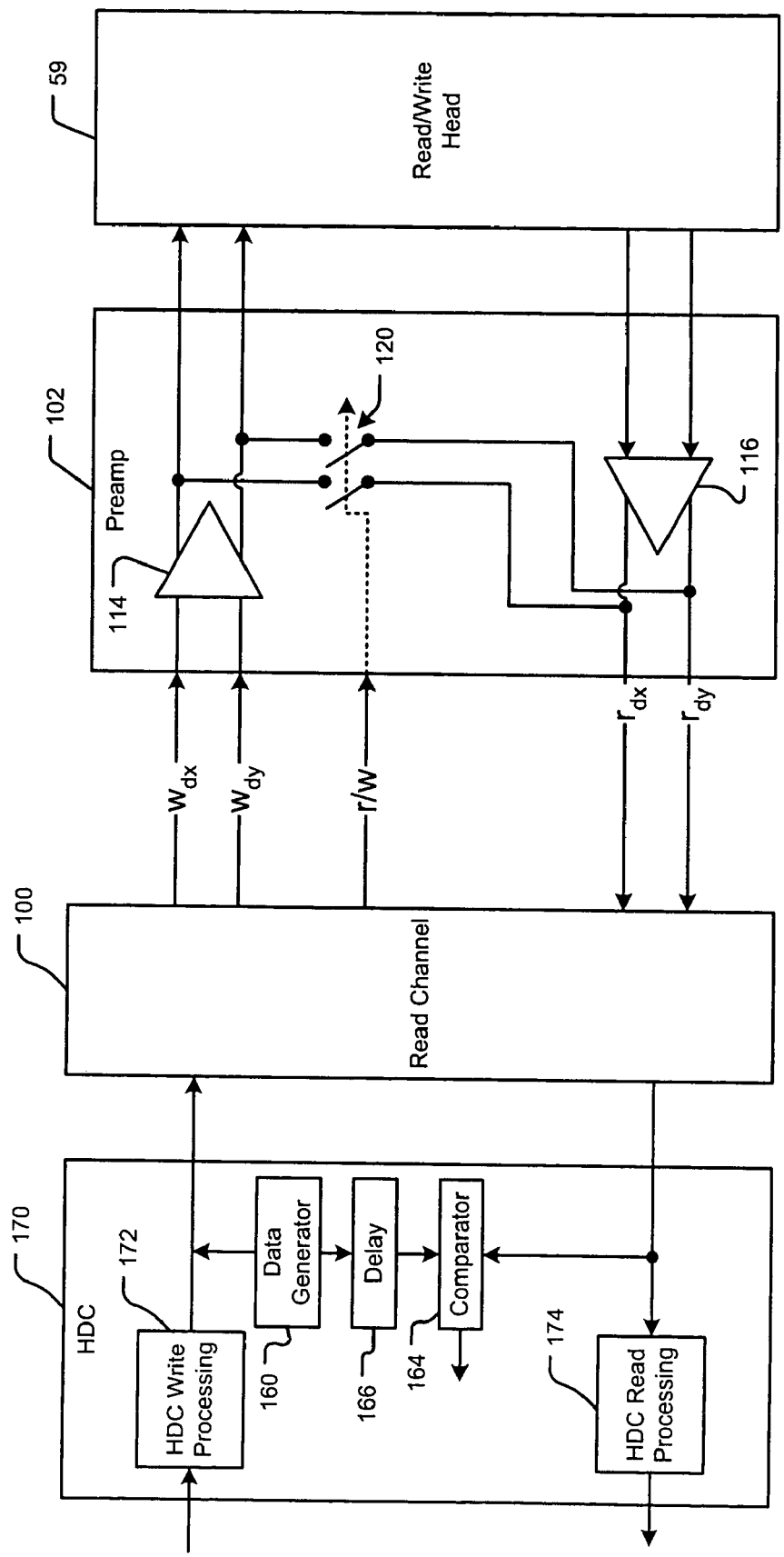
FIG. 8 is a functional block diagram of a hard drive controller that includes a data generator, a delay element and a comparator, a read channel circuit and preamp circuit with loopback according to the present invention.

Referring now to FIG. 8, a hard drive control (HDC) circuit 170 includes a HDC write processing circuit 172 in the write path and a HDC read processing circuit 174 in the read path. The data generator 160 generates a test symbol that is output by the HDC 170, encoded by the read channel circuit 100 and transmitted to the preamp circuit 102. The write signal is amplified by the write amplifier 114 and looped back by the switch 120 during the loopback mode to the read channel circuit 100 where decoding occurs. The received symbol is output to the comparator 164 in the HDC 170. As can be appreciated, a multiplexer can also be used.

The comparator 164 compares the received symbol to a delayed test signal. The delay element 166 can be used to delay the test symbol for an appropriate amount of time. As can be appreciated, a latch, a buffer or any other suitable device can alternatively be used to store the test symbol until the appropriate time. If the symbols match, the comparator 164 outputs a first state. If the symbols do not match, the comparator 164 outputs a second state. The first state corresponds to an operational preamplifier circuit. The second state corresponds to a non-operational preamplifier circuit. Faults and/or flags can optionally be generated when the comparator outputs the second state.

The data generator, delay, and comparator components can be located anywhere on the read/write path, integrated with any device located on the read/write path, located in a host, and/or located in any other suitable device. Skilled artisans will appreciate that the embodiments in FIGS. 5-8 may also be implemented using a multiplexer in a manner similar to FIGS. 3B and 4. When the switch 120 is used in FIGS. 3A, 5 and 7, the read amplifier 116 is optionally turned off during the loopback mode to reduce noise in the system due to signals from the read/write head 59. In one implementation, the signal that is used to initial the loopback mode can also be used to shut down the read amplifier 116. Alternately, the signal that is used to initiate the loopback mode can be used to trigger the additional switches and/or multiplexers that are used to turn off the read amplifier 116.

While the present invention has been described in conjunction with hard drives, skilled artisans will appreciate that the foregoing invention has application to any data storage device including hard disk drives, compact disk (CD) drives (write and/or read/write), digital video disk (DVD) drives (read and/or read/write), optical drives, and/or any other type of data storage device.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A data storage device preamplifier circuit, comprising:
   a write amplifier having an input and an output;
   a read amplifier having an input and an output; and
   a loopback circuit that selectively connects said output of said write amplifier to said output of said read amplifier.

2. The data storage device preamplifier circuit of claim 1 wherein said write amplifier amplifies a write signal that is received from a read channel circuit and outputs said amplified write signal to a read/write device and wherein said read amplifier amplifies a read signal that is received from the read/write device and outputs said amplified read signal to the read channel circuit.

3. The data storage device preamplifier circuit of claim 2 wherein said loopback circuit includes at least one of a switch and a multiplexer that selectively connects said output of said write amplifier to said output of said read amplifier.

4. The data storage device preamplifier circuit of claim 3 further comprising a trigger circuit that controls said at least one of said switch and said multiplexer.

5. The data storage device preamplifier circuit of claim 3 wherein at least one of said switch and said multiplexer is controlled by a write enable signal that is generated by the read channel circuit.

6. The data storage device preamplifier circuit of claim 1 wherein said read amplifier is shut down when said loopback circuit connects said output of said write amplifier to said output of said read amplifier.

7. A read channel circuit for a data storage device, comprising:
   a first counter that generates a first count of an attribute of a write signal that is output by said read channel circuit; and
   a second counter that generates a second count of said attribute of a looped-back write signal that is received by said read channel circuit.

8. The read channel circuit of claim 7 further comprising a comparator that compares a difference between said first count and said second count to a threshold and that outputs a first state when said difference is less than said threshold and a second state when said difference is not less than said threshold.

9. The read channel circuit of claim 7 wherein said read channel circuit generates a write enable signal that is output to a preamplifier circuit to enable a loopback mode of the preamplifier circuit.

10. The read channel circuit of claim 7 wherein said attribute is at least one of a rising edge, a falling edge and a pulse.

11. A read/write path for a data storage device, comprising:
    a read channel circuit; and
    a preamplifier circuit that communicates with said read channel circuit and that includes a loopback circuit,
    wherein said preamplifier circuit includes:

a write amplifier that amplifies a write signal from said read channel circuit and that outputs said amplified write signal to the storage device; and a read amplifier that amplifies a read signal received from the data storage device, wherein said loopback circuit communicates with said write amplifier and said read amplifier and selectively provides a loopback path to test the operation of said write amplifier.

12. The read/write path of claim 11 wherein said loopback circuit selectively connects an output of said write amplifier to an output of said read amplifier.

13. The read/write path of claim 11 wherein said loopback circuit includes at least one of a switch and a multiplexer that selectively connects an output of said write amplifier to said output of said read amplifier.

14. The read/write path of claim 11 wherein said read amplifier is shut down when said loopback circuit connects said output of said write amplifier to said input of said read amplifier.

15. The read/write path of claim 13 further comprising a trigger circuit that controls said at least one of said switch and said multiplexer.

16. The read/write path of claim 13 wherein said read channel circuit generates a write enable signal that controls said at least one of said switch and said multiplexer.

17. The read/write path of claim 11 wherein said read channel circuit includes:

a first counter that generates a first count of an attribute of a write signal that is output to said preamplifier circuit;

a second counter that generates a second count of said attribute of a loop-back write signal that is received from said preamplifier circuit; and a comparator that determines an operating condition of the preamplifier circuit based on said first count and said second count.

18. The read/write path of claim 17 wherein said comparator compares a difference between said first count and said second count to a threshold and outputs a first state when said difference is less than said threshold and a second state when said difference is not less than said threshold.

19. The read/write path of claim 17 wherein said read channel circuit generates a write enable signal that is output to said preamplifier circuit.

20. The read/write path of claim 17 wherein said attribute is at least one of a rising edge, a falling edge and a pulse.

21. A data storage device preamplifier circuit, comprising:

write amplifying means having an input and an output for amplifying a write signal;

read amplifying means having an input and an output for amplifying a read signal; and loopback means for selectively connecting said output of said write amplifying means to said output of said read amplifying means.

22. The data storage device preamplifier circuit of claim 21 wherein said write amplifying means amplifies said write signal that is received from a read channel circuit and outputs said amplified write signal to a read/write device and wherein said read amplifying means amplifies said read signal that is received from the read/write device and outputs said amplified read signal to the read channel circuit.

23. The data storage device preamplifier circuit of claim 22 wherein said loopback means includes switching means for selectively connecting said output of said write amplifying means to said output of said read amplifier.

24. The data storage device preamplifier circuit of claim 23 further comprising trigger means for controlling said switching means.

25. The data storage device preamplifier circuit of claim 23 wherein said switching means is controlled by a write enable signal from the read channel circuit.

26. The data storage device preamplifier circuit of claim 21 wherein said read amplifying means is shut down when said loopback means connects said output of said write amplifying means to said output of said read amplifying means.

27. A read channel circuit for a data storage device, comprising:

first counting means for generating a first count of an attribute of a write signal that is output by said read channel circuit; and second edge counting means for generating a second count of said attribute of a looped-back write signal that is received by said read channel circuit.

28. The read channel circuit of claim 27 further comprising comparing means for comparing a difference between said first count and said second count to a threshold and for generating a first state when said difference is less than said threshold and a second state when said difference is not less than said threshold.

29. The read channel circuit of claim 27 wherein said read channel circuit generates a write enable signal that is output to a preamplifier circuit to enable a loopback mode of the preamplifier circuit.

30. The read channel circuit of claim 27 wherein said attribute is at least one of a rising edge, a falling edge and a pulse.

31. A read/write path for a data storage device, comprising:

read channel means for generating write signals and for receiving read signals; and preamp means that communicates with said read channel means for amplifying said write signals and said read signals and including loopback means for providing a loopback path for testing said preamp means, wherein said preamp means includes:

write amplifying means for amplifying a write signal from said read channel means and for outputting said amplified write signal to a read/write device; and read amplifying means for amplifying a read signal received from the read/write device, wherein said loopback means communicates with said write amplifying means and said read amplifying means, wherein said loopback means includes switching means for selectively connecting an output of said write amplifying means to an output of said read amplifying means.

32. The read/write path of claim 31 further comprising trigger means for controlling said switching means.

33. The read/write path of claim 31 wherein said read channel means generates a write enable signal that controls said switching means.

34. A read/write path for a data storage device, comprising:

read channel means for generating write signals and for receiving read signals; and preamp means that communicates with said read channel means for amplifying said write signals and said read signals and including loopback means for providing a loopback path for testing said preamp means, wherein said preamp means includes:

write amplifying means for amplifying a write signal from said read channel means and for outputting said amplified write signal to a read/write device; and read amplifying means for amplifying a read signal received from the read/write device, wherein said loopback means communicates with said write amplifying means and said read amplifying means, wherein said read amplifying means is shut down when said loopback means connects said output of said write amplifying means to said output of said read amplifying means.

35. The read/write path of claim 31 wherein said read channel means includes:

first counting means for generating a first count of an attribute of a write signal that is output to said preamp means;

second counting means for generating a second count of said attribute of a looped-back write signal that is received from said preamp means; and comparing means for determining an operating condition of the preamp means based on said first count and said second count.

36. The read/write path of claim 35 wherein said comparing means compares a difference between said first count and said second count to a threshold and outputs a first state when said difference is less than said threshold and a second state when said difference is not less than said threshold.

37. The read/write path of claim 35 wherein said read channel means generates a write enable signal that is output to said preamp means.

38. The read/write path of claim 35 wherein said attribute is at least one of a rising edge, a falling edge and a pulse.

39. A method for testing operation of a preamplifier circuit, comprising:

generating a first count of an attribute of a write signal;

transmitting said write signal to a write signal input of said preamplifier circuit; and looping said write signal back to a read signal output of said preamplifier circuit.

40. The method of claim 39 further comprising generating a second count of said attribute of said looped-back write signal.

41. The method of claim 40 further comprising:

comparing said first count to said second count; and diagnosing operability of said preamplifier circuit based on said comparison.

42. The method of claim 41 further comprising:

generating a difference between said first count and said second count; and comparing said difference to a threshold.

43. The method of claim 42 further comprising signaling non-operability of said preamplifier circuit when said difference is greater than said threshold.

44. The method of claim 39 wherein said preamplifier circuit includes a read amplifier and further comprising shutting said read amplifier down during said looping step.

45. A method for operating a preamplifier circuit having a write signal input and a read signal output, comprising:

receiving a write signal at said write signal input of said preamplifier; and selectively looping back said write signal to said read signal output.

46. The method of claim 45 further comprising amplifying said write signal before said looping back step.

47. The method of claim 46 further comprising further amplifying said write signal after said amplifying and loopback steps.

48. The method of claim 45 further comprising shutting down a read amplifier of said preamplifier circuit when said loopback step is performed.

49. The method of claim 45 further comprising:

generating a first count an attribute of said write signal that is input to said write signal input of said preamplifier circuit;

generating a second count of said attribute of said write signal output at said read signal output of said preamplifier circuit; and comparing said first count and said second count.

50. The method of claim 49 further comprising:

generating a difference between said first count and said second count;

comparing said difference to a threshold; and signaling non-operability of said preamplifier circuit when said difference is greater than said threshold.

51. A method for operating a preamplifier circuit, comprising:

selectively operating said preamplifier circuit in a write mode;

selectively operating said preamplifier circuit in a read mode; and selectively operating said preamplifier circuit in a write mode with loopback, wherein said write mode with loopback further comprises:

receiving a write signal at a write signal input of said preamplifier;

amplifying said write signal; and looping back said write signal to a read signal output of said preamplifier.

52. The method of claim 51 further comprising further amplifying said write signal after said amplifying and loopback steps.

53. The method of claim 51 further comprising shutting down a read amplifier of said preamplifier circuit when said loopback step is performed.

54. The method of claim 51 further comprising:

generating a first count an attribute of said write signal that is input to said write signal input of said preamplifier circuit;

generating a second count of said attribute of said write signal output at said read signal output of said preamplifier circuit; and comparing said first count and said second count.

55. The method of claim 54 further comprising:

generating a difference between said first count and said second count;

comparing said difference to a threshold; and signaling non-operability of said preamplifier circuit when said difference is greater than said threshold.

56. A method for testing operation of a preamplifier circuit, comprising:

generating a write signal;

generating a first count of an attribute of said write signal;

receiving a read signal; and generating a second count of said attribute of said read signal.

57. The method of claim 56 wherein said write signal is looped back in said preamplifier circuit as said read signal.

58. The method of claim 56 further comprising:

comparing said first count to said second count; and diagnosing operability of said preamplifier circuit based on said comparing step.

59. The method of claim 56 further comprising:

generating a difference between said first count and said second count; and comparing said difference to a threshold.

60. The method of claim 59 further comprising signaling non-operability of said preamplifier circuit when said difference is greater than said threshold.

61. The method of claim 56 wherein said method is implemented by a read channel circuit.

62. The method of claim 56 wherein said method is implemented by a hard disk controller (HDC).

* * * * *

UNITED STATES PATENT AND TRADEMARK OFFICE
CERTIFICATE OF CORRECTION

PATENT NO.         : 7,477,467 B1                                        Page 1 of 1
APPLICATION NO.    : 10/722079
DATED              : January 13, 2009
INVENTOR(S)        : Pantas Sutardja It is certified that error appears in the above-identified patent and that said Letters Patent is hereby corrected as shown below:

Column 1, Line 14     Insert -- with -- after "associated"
Column 7, Line 3      Insert -- data -- before "storage"
Column 10, Line 2     Insert -- of -- after "count"
Column 10, Line 37    Insert -- of -- after "count"

Signed and Sealed this

Tenth Day of March, 2009

JOHN DOLL
*Acting Director of the United States Patent and Trademark Office*